(12) United States Patent
Halepovic et al.

(10) Patent No.: US 10,735,744 B2
(45) Date of Patent: Aug. 4, 2020

(54) ADAPTIVE BITRATE STREAMING TECHNIQUES

(71) Applicant: AT&T Intellectual Property I, L.P., Atlanta, GA (US)

(72) Inventors: Emir Halepovic, Somerset, NJ (US); Cyriac James, Calgary (CA); Mea Wang, Calgary (CA)

(73) Assignees: AT&T Intellectual Property I, L.P., Atlanta, GA (US); The Governors of the University of Calgary, Calgary AB (CA)

( * ) Notice: Subject to any disclaimer, the term of this patent is extended or adjusted under 35 U.S.C. 154(b) by 99 days.

(21) Appl. No.: 16/167,251

(22) Filed: Oct. 22, 2018

(65) Prior Publication Data
US 2020/0128255 A1   Apr. 23, 2020

(51) Int. Cl.
| H04N 19/159 | (2014.01) |
| H04N 19/176 | (2014.01) |
| H04N 19/31  | (2014.01) |
| H04N 19/154 | (2014.01) |

(52) U.S. Cl.
CPC ......... H04N 19/159 (2014.11); H04N 19/154 (2014.11); H04N 19/176 (2014.11); H04N 19/31 (2014.11)

(58) Field of Classification Search
CPC .. H04N 19/159; H04N 19/176; H04N 19/154; H04N 19/31
See application file for complete search history.

(56) References Cited

U.S. PATENT DOCUMENTS

| 6,393,057 B1* | 5/2002 | Thoreau | H04N 7/24 375/240 |
| 6,621,979 B1* | 9/2003 | Eerenberg | H04N 5/783 386/346 |
| 7,493,644 B1* | 2/2009 | Tanskanen | H04N 5/4401 725/102 |
| 7,853,980 B2* | 12/2010 | Pedlow, Jr. | H04N 7/17318 725/88 |
| 8,948,249 B2 | 2/2015 | Sun et al. | |

(Continued)

OTHER PUBLICATIONS

Bruneau-Queyreix, Joachim, et al., "Multiple Description-Dash: Pragmatic video streaming maximizing End-Users' Quality of Experience", Communications (ICC), 2016 IEEE International Conference on. IEEE, 2016.

*Primary Examiner* — James M Pontius

(57) ABSTRACT

Devices, computer-readable media, and methods for recording a video chunk in a designated order comprising a plurality of intra-frame coded frames followed by a plurality of inter-frame coded frames are disclosed. For instance, a processing system including at least one processor may obtain a video chunk associated with a time block of a video. In one example, the video chunk includes a plurality of frames encoded in a bitrate of a plurality of available bitrates for the time block of the video, and the plurality of frames includes a plurality of intra-frame coded frames and a plurality of inter-frame coded frames. In one example, the plurality of frames is in a first order. The processing system may then record the video chunk in a second order comprising the plurality of intra-frame coded frames followed by the plurality of inter-frame coded frames.

20 Claims, 6 Drawing Sheets

(56) References Cited

U.S. PATENT DOCUMENTS

| | | | |
|---|---|---|---|
| 9,025,676 B2 * | 5/2015 | Alvarez | H04N 19/615 375/240.29 |
| 9,215,182 B2 | 12/2015 | Gahm et al. | |
| 9,258,333 B2 | 2/2016 | Bichot et al. | |
| 9,306,994 B2 | 4/2016 | Gahm et al. | |
| 9,350,988 B1 * | 5/2016 | Bankoski | H04N 19/103 |
| 9,392,304 B2 | 7/2016 | Coudurier et al. | |
| 9,516,078 B2 | 12/2016 | Catchpole et al. | |
| 9,530,451 B2 | 12/2016 | Guerrera et al. | |
| 9,866,605 B2 | 1/2018 | Begen et al. | |
| 9,894,421 B2 | 2/2018 | Dao et al. | |
| 9,986,303 B2 * | 5/2018 | Takehara | H04N 21/234327 |
| 2007/0064815 A1 * | 3/2007 | Alvarez | H04N 19/615 375/240.29 |
| 2011/0228789 A1 * | 9/2011 | Jia | H04L 45/00 370/401 |
| 2012/0030723 A1 | 2/2012 | Baum et al. | |
| 2016/0219091 A1 | 7/2016 | Gabin et al. | |
| 2017/0111670 A1 | 4/2017 | Ducloux et al. | |
| 2017/0280143 A1 * | 9/2017 | Xu | H04N 19/103 |

\* cited by examiner

ADAPTIVE BITRATE STREAMING TECHNIQUES

The present disclosure relates generally to adaptive bitrate streaming videos, and more particularly to devices, non-transitory computer-readable media, and methods for recording a video chunk in a designated order comprising a plurality of intra-frame coded frames followed by a plurality of inter-frame coded frames, and for processing frames of a video chunk received in a designated order comprising a plurality of intra-frame coded frames followed by a plurality of inter-frame coded frames.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
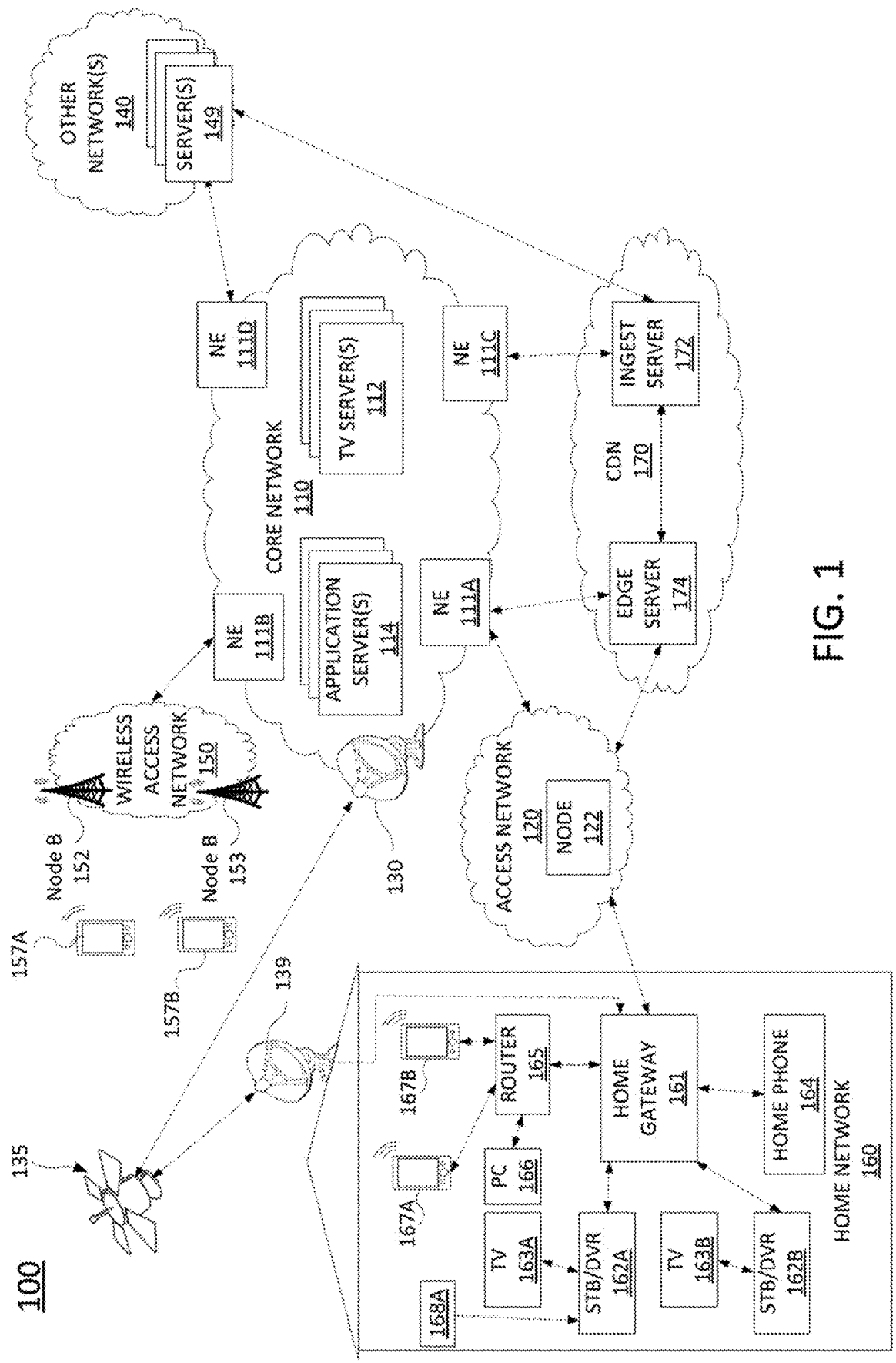
FIG. 1 illustrates an example network related to the present disclosure.

In one example, the present disclosure describes a device, computer-readable medium, and method for recording a video chunk in a designated order comprising a plurality of intra-frame coded frames followed by a plurality of inter-frame coded frames. For instance, a processing system including at least one processor may obtain a video chunk associated with a time block of a video. In one example, the video chunk includes a plurality of frames encoded at a bitrate of a plurality of available bitrates for the time block of the video, and the plurality of frames includes a plurality of intra-frame coded frames and a plurality of inter-frame coded frames. In one example, the plurality of frames is in a first order. The processing system may then record the video chunk in a second order comprising the plurality of intra-frame coded frames followed by the plurality of inter-frame coded frames.

In another example, the present disclosure describes a device, computer-readable medium, and method for processing frames of a video chunk received in a first order comprising a plurality of intra-frame coded frames followed by a plurality of inter-frame coded frames. For instance, a processing system including at least one processor may receive a first plurality of frames of a first video chunk from a source device. In one example, the first video chunk is associated with a first time block of a video, the first plurality of frames includes a plurality of intra-frame coded frames and a plurality of inter-frame coded frames, and the first plurality of frames are received from the source device in the first order comprising the plurality of intra-frame coded frames followed by the plurality of inter-frame coded frames. The processing system may then record the first plurality of frames in a video buffer and play the first plurality of frames of the first video chunk in a second order or a second plurality of frames of a second video chunk in the second order, wherein the first order is different from the second order.

Video delivery technology has shifted from legacy protocols such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH). A common feature of HTTP-based adaptive streaming protocols is the availability of video in multiple chunks associated with the each time block of a video and having different encoding bitrates, with the chunks linked together by a manifest file, or "index file" that defines all of the variants/tracks (e.g., respective sets of chunks, each set at a different bitrate/encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track. In this case, the chunk may be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

A time block of an adaptive bitrate video may have multiple associated chunks at respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/indices, or the like which indicate a relative (temporal) order of the time blocks within the overall video. For instance, time block indicators for each available chunk may be included in the manifest file so that a player device may determine which chunks may be requested for each time block and so that player device may determine which chunk(s) to request next (e.g., for successive time blocks).

A variety of factors may affect users' quality of experience for video streaming. These include video stalls, startup delay, and poor video/audio quality. Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants) and stored on servers as separate files. A video client running on a mobile device, home television, game console, web browser, etc. chooses which video rate to stream by monitoring network conditions and estimating the available network capacity.

The function of the ABR algorithm is to select ABR variants (called representations in DASH) in real time to maximize video quality and minimize re-buffering events. Typically, a video client maintains a media cache (also referred to as a "buffer" or "video buffer"), by pre-fetching video chunks, then playback occurs from the cache. For each time block of a video-on-demand (VoD) program/live channel, the video client selects which variant (chunk) of that time block to download into the cache. Higher quality chunks for a given time block are larger in size (data volume) and take longer to download than lower quality chunks. In general, the goal is to download as high quality a chunk as possible each time while keeping the buffer from going empty.

One approach to variant or chunk selection is channel capacity estimation, which uses chunk download time as an estimate of available channel bitrate. The video client selects a chunk of a variant having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, to keep the buffer from going empty or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the variant bitrate selected. This ensures conservative behavior, e.g., selecting minimum quality/chunk size, when the buffer is low, i.e., filling the buffer more quickly using a chunk of a lower variant and aggressive behavior, e.g., selecting maximum quality/chunk size, when the buffer is full or nearly so, i.e., filling the buffer more slowly using a chunk of a higher variant.

In response to bandwidth drops and/or buffer depletion, a client may request a chunk for the same time block at a lower quality level (lower bitrate variant) and may discard the partially downloaded chunk, which results in bandwidth waste. This also increases the chance of playback stalls, and leads to a lower average bitrate of the chunks downloaded and more frequent quality switches. In contrast, examples of the present disclosure provide improved bandwidth efficiency, while maintaining the video quality and visual stability. For instance, examples of the present disclosure exploit the temporal property of inter-frame coding protocols (such as, Advanced Video Coding (AVC) and High Efficiency Video Coding (HEVC)) and prioritize frames within a video chunk so that reference frames (frames for successfully decoding temporal information) are sent first followed by non-reference frames (optional frames). It has been confirmed that varying the temporal property has no impact on spatial and amplitude properties of a video, while spatial and amplitude features are inter-dependent. Moreover, altering the temporal property has less negative impact on video quality than altering spatial and amplitude properties.

In one example, frames of a video chunk are organized in a designated order comprising a plurality of intra-frame coded frames (e.g., I-frames) followed by a plurality of inter-frame coded frames. In one example, the plurality of inter-frame coded frames comprises a plurality of forward predicted frames (e.g., P-frames) and a plurality of bidirectional predicted frames. In addition, in one example, the plurality of bidirectional predicted frames may comprise a plurality of reference bidirectional predicted frames (e.g., B-frames) and a plurality of non-reference bidirectional predicted frames (e.g., b-frames). The designated order may further comprise, as relates to the plurality of inter-frame coded frames, the plurality of forward predicted frames, followed by the plurality of reference bidirectional predicted frames, followed by the plurality of non-reference bidirectional predicted frames. In one example, the designated order may further include a random order of the plurality of bidirectional predicted frames of the video chunk.

Examples of the present disclosure also enable the use of partial video chunks at an ABR video player. In particular, the frames at the end of a video chunk are the most likely to be not received before a timeout for dropping the chunk and switching to a lower bitrate variant. However, with non-reference frames placed at the end of the video chunk, the likelihood that all reference frames will be received before the timeout is increased. It should be noted that the loss of non-reference frames will not hinder decoding, but may lead to quality distortion within the temporal domain. The level of distortion may vary depending on motion activity (MA) and the rate of change of motion activity from one group of pictures (GOP) to the next. In one example, a per-chunk loss tolerance level is defined which sets the number of frames of a video chunk for which a partial chunk may be accepted by the video player. As described in greater detail below, the use of partial chunks allows for a more continuous range of visual qualities to be obtained, with less switching between discrete bitrates/encoding levels and a better overall quality of experience to end users.

Examples, of the present disclosure may be practically implemented within any existing HAS system. The video player downloads a metadata file (such as the manifest file, or media presentation description (MPD) in DASH), which contains information about variant quality levels (e.g., bitrate, resolution, frame rate, etc.). The metadata file may include additional information on video chunk size, offset (e.g., the number of reference frames) and per-chunk loss tolerance levels. The video player may use this information to dynamically make a decision to drop or continue downloading, based on the current fraction of a video chunk downloaded, such that video quality, stability, and bandwidth efficiency can be maintained during the video session. Examples of the present disclosure may be integrated into a video player as a plug-in that can be enabled or disabled, e.g., depending upon if the video is stored and/or transmitted in accordance with the frame ordering as described herein.

It should also be noted that although examples of the present disclosure are described primarily in connection with a video client and video streaming, examples of the present disclosure may be similarly applied to other types of streaming media, such as adaptive bitrate streaming audio. In addition, although aspects of the present disclosure may be most applicable in the context of live streaming with shallow buffers, the present disclosure may be equally applicable to on-demand streaming of recorded programs. These and other aspects of the present disclosure are described in greater detail below in connection with the examples of FIGS. 1-6.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of ABR videos. In one example, each of servers 149 may also make available manifest files which describe the variants of a video and the segments/video chunks thereof which are stored on the respective one of the servers 149. For instance, there may be several video chunks containing video and audio for the same time block (e.g., a 2-10 second portion) of the video, but which are encoded at different bitrates in accordance with an adaptive bitrate streaming protocol. Thus, an adaptive bitrate streaming video player may request and obtain any one of the different video chunks for the time block, e.g., depending upon a state of a video buffer of the adaptive bitrate streaming video player, depending upon network bandwidth or other network conditions, depending upon the access rights of the adaptive bitrate streaming video player to different variants (e.g., to different encoding levels/bitrates) according to a subscription plan and/or for the particular video, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 5:
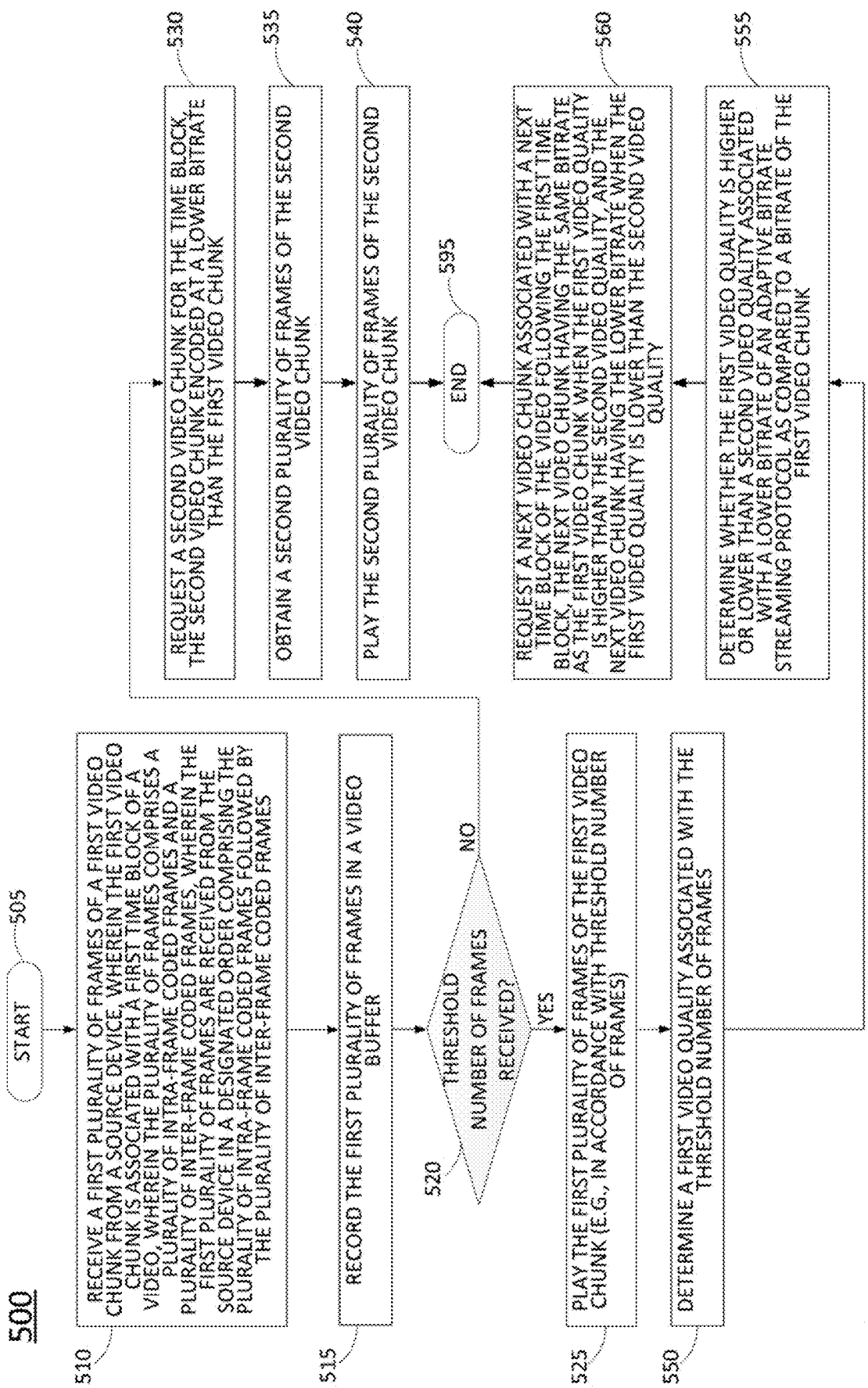
FIG. 5 illustrates a flowchart of an example method for processing frames of a video chunk received in a designated order comprising a plurality of intra-frame coded frames followed by a plurality of inter-frame coded frames.

In one example, one or both of the STB/DVR 162A and STB/DVR 162B may comprise all or a portion of a computing device or system, such as computing system 600, and/or processing system 602 as described in connection with FIG. 6 below, specifically configured to perform various steps, functions, and/or operations for processing frames of a video chunk received in a designated order comprising a plurality of intra-frame coded frames followed by a plurality of inter-frame coded frames. Among other functions, STB/DVR 162A and STB/DVR 162B may comprise adaptive bitrate streaming video players capable of playing adaptive bitrate streaming videos in formats such as H.264 (Advanced Video Coding (AVC)), H.265 (High Efficiency Video Coding (HEVC)), Moving Picture Expert Group (MPEG) .mpeg files, .mov files, .mp4 files, 0.3gp files, .f4f files, .m3u8 files, or the like. A flowchart of an example method of processing frames of a video chunk received in a designated order comprising a plurality of intra-frame coded frames followed by a plurality of inter-frame coded frames is illustrated in FIG. 5 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for processing frames of a video chunk received in a designated order comprising a plurality of intra-frame coded frames followed by a plurality of inter-frame coded frames, as described herein, and may comprise an adaptive bitrate streaming video player capable of playing adaptive bitrate streaming videos. For instance, one or more of mobile devices 157A, 157B, 167A and 167B, and/or PC 166 may also comprise all or a portion of a computing device or system, such as computing system 600, and/or processing system 602 as described in connection with FIG. 6 below, specifically configured to perform various steps, functions, and/or operations for processing frames of a video chunk received in a designated order comprising a plurality of intra-frame coded frames followed by a plurality of inter-frame coded frames, as described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, ingest server 172 and/or edge server 174 may comprise all or a portion of a computing device or system, such as computing system 600, and/or processing system 602 as described in connection with FIG. 6 below, specifically configured to perform various steps, functions, and/or operations in connection with processing frames of a video chunk received in a designated order comprising a plurality of intra-frame coded frames followed by a plurality of inter-frame coded frames, and/or recording a video chunk in a designated order comprising a plurality of intra-frame coded frames followed by a plurality of inter-frame coded frames.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of a computing device or system, such as computing system 600, and/or processing system 602 as described in connection with FIG. 6 below, specifically configured to perform various steps, functions, and/or operations in connection with processing frames of a video chunk received in a designated order comprising a plurality of intra-frame coded frames followed by a plurality of inter-frame coded frames, and/or recording a video chunk in a designated order comprising a plurality of intra-frame coded frames followed by a plurality of inter-frame coded frames, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video, as described herein. For example, STB/DVR 162A may present a user interface and receive one or more inputs (e.g., via remote control 168A) for a selection of an adaptive bitrate streaming video. STB/DVR 162A may request the video from an interactive TV/VoD server and/or network-based DVR server, which may retrieve the manifest file for the video from one or more of application servers 114 and provide the manifest file to STB/DVR 162A. STB/DVR 162A may then obtain video chunks of the video as identified in the manifest file.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video may comprise, for example, one of the servers 149 or one of the TV servers 112. The chunks of the video may be obtained from an origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 176A, 167B, 157A or 157B obtaining a manifest file for a video from one of the TV servers 112, from one of the servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

It should also be noted that in accordance with the present disclosure, any one or more devices of system 100 may perform operations for recording a video chunk in a designated order comprising a plurality of intra-frame coded frames followed by a plurality of inter-frame coded frames, as described herein, such as one or more of application servers 114, TV servers 112, ingest server 172, edge server 174, one or more of servers 149, and so forth. For instance, any one or more of such devices may comprise a processing system to create video chunks for variants of ABR videos, and which have a designated order of intra-frame coded frames followed by inter-frame coded frames. In addition, any of the devices of system 100 that may comprise an adaptive bitrate streaming video player, such as STB/DVR 162A, STB/DVR 162B, TV 163A, TV 163B, PC 166, mobile devices 176A, 167B, 157A, and 157B, and so on, may also be configured to receive and play-out video chunks having frames in the designated order, as described herein.

Further details regarding the functions that may be implemented by application servers 114, TV servers 112, ingest server 172, servers 149, STBs/DVRs 162A and 162B, TV 163A, TV 163B, mobile devices 157A, 157B, 167A and 167B, and/or PC 166 are discussed in greater detail below in connection with the examples of FIGS. 2-6. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
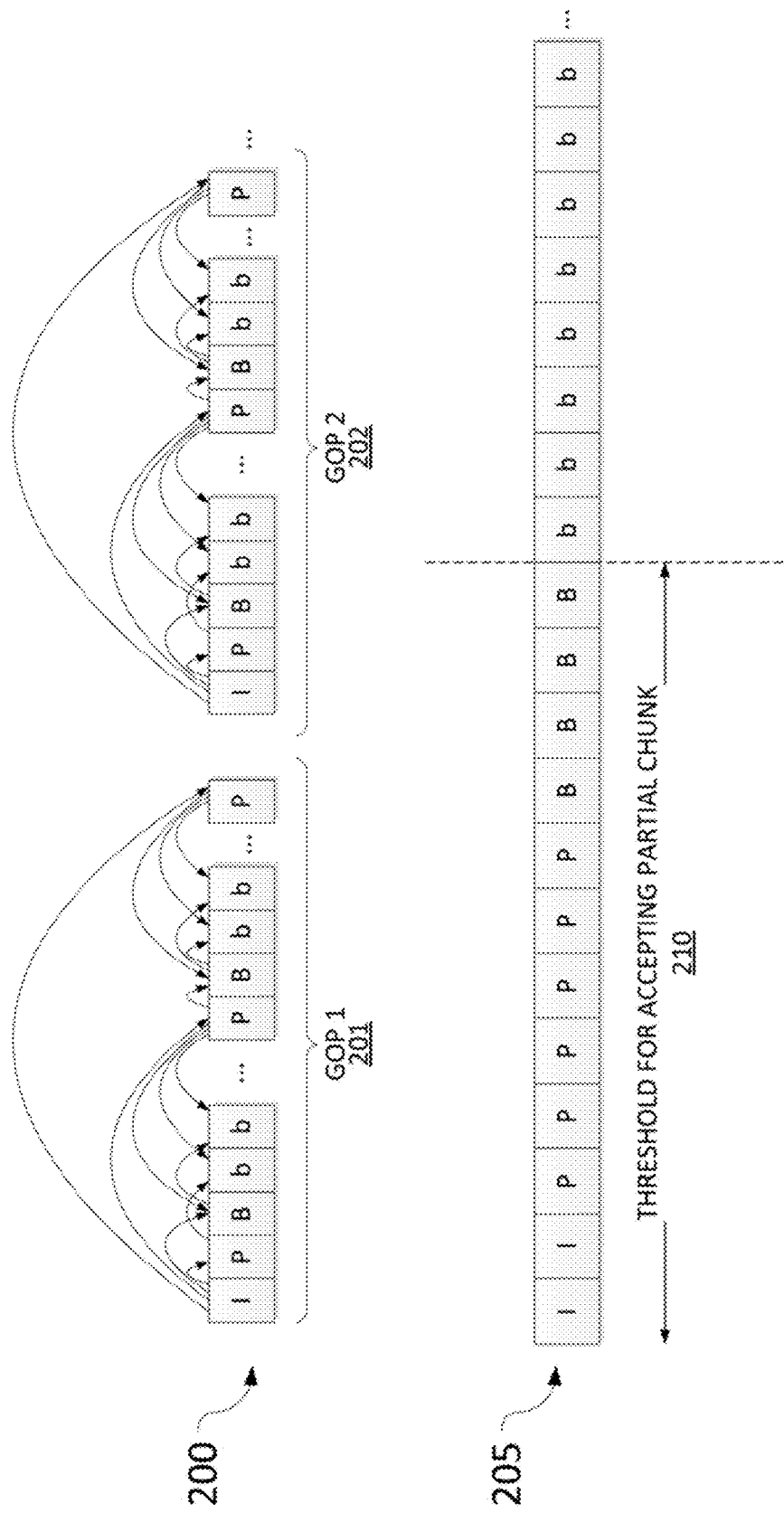
FIG. 2 illustrates an example frame ordering of a video chunk in accordance with the present disclosure.

Referring now to FIG. 2, in HEVC or AVC, the sequence of raw video frames (also called pictures) of a video are converted into coded bitstream and then transmitted over the network. An HEVC (or AVC) bitstream is structured into Network Abstraction Layer (NAL) units, which are essentially video packets that can be transmitted separately over the network and have a size less than the Maximum Transfer Unit (MTU) of the network. An encoded frame is placed into a single or multiple NAL units. The bitstream is converted back to raw pictures by the decoder before playback. There are two types of redundancies utilized by an encoder to perform video compression: spatial and temporal. Each raw frame is divided into blocks of pixels. The spatial redundancy refers to the intra-dependency among blocks within a frame, while the temporal redundancy refers to the inter-dependency among blocks across frames. The coded bitstream (e.g., following HEVC or AVC) is a sequence of Group of Pictures (GOPs), each comprising a number of coded frames. One or more GOPs form a unit of video, and more particularly in connection with adaptive bitrate schemes, a video chunk that is associated with a time block and encoded at a target bitrate (e.g., a video chunk of one of a plurality of variants). In accordance with the present disclosure, in one example, closed GOPs are used (with no temporal dependency across GOPs), since there may be switching between chunks of different variants from one time block to the next.

In HEVC or AVC, adaptive bitrate (ABR) rate control is employed to allocate bitrate to each frame in order to achieve an overall rate near a target bit rate, and at the same time maintain reasonable quality across frames. An encoded HEVC or AVC video is a series of GOPs. Encoding example 200 illustrates a frame structure for a video chunk comprising two GOPs, GOP 1 (201) and GOP 2 (202) in a particular frame order (broadly a first order). In one example, this frame order is a presentation order, i.e., an order in which the frames are temporally displayed. In another example, this frame order is an encoding order, i.e., an order in which the frames are encoded based on motion compensated prediction. Each GOP begins with an I-frame that is used to infer the P-frames and some B-frames within the GOP. An I-frame is strictly intra-coded, and provides a point in the video stream where a decoding can start without reference to any past or future frames. Following the I-frame, there is a series of PBb sequences (e.g., inter-coded frames). This sequence begins with a P-frame, and then a reference B-frame, followed by a sequence non-reference b-frames (denoted by 'b'). The number of consecutive non-reference b-frames could be anywhere between 1 and 16. In terms of temporal dependency, an I-frame is independent of all other frames, while a P-frame can depend on at most one other frame, which could be either an I-frame or a P-frame. A reference B-frame (or a non-reference b-frame) can depend on at most two other frames, which could be either an I-frame, a P-frame, or a B-frame. The relation among these frames is defined by the temporal coding property.

The frames of a video are transmitted in the encoding order as displayed in the encoding example 200. However, any corruption in the I-frames, P-frames, or (reference) B-frames will make a GOP non-decodable since these frames are needed to decode other frames. The corruption in any of the non-reference b-frames will not impact the decodability of other frames in a GOP, but will incur some trade-offs in terms of visual quality (e.g., in the temporal quality). In contrast, examples of the present disclosure provide video chunks with a designated order (broadly a first order or a second order, depending upon whether the perspective is transmission or reception) reflecting the importance of frames in the decoding process. For instance, in one example, I-frames, P-frames, and (reference) B-frames of a video chunk are delivered first, followed by (non-reference) b-frames last. For example, all reference frames are delivered first before any non-reference frames will be delivered. This designated order is illustrated in the encoding example 205. It should be noted that all of the I-frames transmitted first may be I-frames from within one or more GOPs (e.g., from GOP 1 and GOP 2, in the present example), and similarly for the P-frames, B-frames, and b-frames. It should be understood that in other examples, a chunk may comprise a single GOP, or may comprise more than two GOPs, e.g., depending upon the duration of the time block associated with the chunk, the GOP length (e.g., the number of frames per GOP), the playback frame rate, and so on. In accordance with the present disclosure, this designated order may also be the order in which frames of a video chunk are stored. Thus, the video chunk may then be transmitted as per any HAS-based mechanism. Furthermore, at a client/playback device, the temporal order of playing the frames may be determined from a unique identifier (e.g., a Picture Order Count or POC in HEVC) that identifies the frames' positions in the display order, regardless of the designated order of frames as stored and/or transmitted over a network. Thus, the frame order (e.g., first order) of frame structure 205 is different from the frame order (e.g., second order) of frame structures 201 and 202.

In one example, the present disclosure guarantees the transmission of I-frames, P-frames, and B-frames, and transmits as many b-frames as the bandwidth allows. Thus, video for all time blocks will be decodable (e.g., avoiding playback stalls due to decoding issues). Examples of the present disclosure may also be used in conjunction with other techniques, such as bandwidth estimation-based rate switching or buffer depletion-based rate switching. For instance, in one example, if at least all of the I-frames, P-frames, a B-frames are received, the player may accept a partial chunk for a current time block when a timeout is reached and move on to a next time block, while a quality level (bitrate variant level) of a chunk for the next time block may be dynamically adjusted according to a current bandwidth estimate. An example threshold 210 for accepting a partial chunk is illustrated in FIG. 2. Notably, the threshold 210 establishes that if all of the I-frames, P-frames, and B-frames (broadly all reference frames) are received, then the player may playback the video chunk for the time block with zero or as many of the b-frames as may be received (e.g., before a timeout).

It is noted that the size of each video chunk varies even for a same target bitrate (e.g., chunks for the same variant and/or encoding level but for different time blocks may have different actual bitrates), even though all chunks represent the same playback duration. For instance, a per-chunk bitrate may vary between 1.8 Mbps and 12.69 Mbps, and the transmission time may vary from 0.7 seconds to 4.91 seconds if 5.3 Mbps is the average available bandwidth. A similar trend is observed for other videos, though the extent of variation differs across videos. In one example, the present disclosure defines a per-chunk timeout ($t_i$) value that is calculated based on the actual chunk size ($s_i$) and the estimated bandwidth ($b_i$) at the time that the chunk is to be transmitted, e.g., $t_i = s_i/b_i$. The per-chunk timeout allows the player to check on the status of the video chunk transmission to detect if bandwidth is falling below the estimate.

Examples of the present disclosure trade b-frames for flexibility. However, the missing frames may be recovered to restore the original frame rate. In one example, any missing b-frames may be replaced with the frame before it (which is more visually appealing than presenting a blank frame). For instance, it is observed that a missing b-frame generally has a high degree of similarity with the b-frame before it. Notably, in each PBb sequence for example, there may be up to 16 b-frames. It may be a concern to replicate all 16 b-frames with the same frame, which may appear as a stall during playback. For instance, for a 2-second segment of a 30 frames per second (fps) video, each frame represents approximately 0.03 seconds. In one extreme example, if at most one b-frame in each PBb/GOP sequence is lost, recovering the missing frame with duplication from the previous frame will not be noticeable. In the other extreme example, if up to 16 consecutive b-frames in each PBb/GOP sequence is lost, the proposed recovery technique may result in a noticeable perception of stalls. In one example, the order of storage and/or transmission of b-frames of a video chunk is shuffled (e.g., randomly) to reduce the chance of consecutive b-frames being dropped. In particular, the b-frames at the end of the video chunk are the most likely to be dropped, but the actual order of playback of such b-frames are scattered throughout the video chunk. Hence, the random shuffle may space out the missing frames to allow better motion continuity during playback of a partial video chunk.

It should also be noted that although examples of the present disclosure are described primarily in connection with an HEVC scheme with I-frames, P-frames, reference B-frames, and non-reference b-frames, the present disclosure is equality applicable to other video coding schemes with inter-frame coded frames and intra-frame coded frames. For example, the arrows between frames in the encoding example 200 are provided for illustrative purposes only and do not preclude various other types of inter-frame coding/frame dependencies. For instance, another coding scheme may exclude reference bidirectional coded frames. Still another coding scheme may include non-reference frames which depend from two or more other frames, but which are not necessarily "bidirectional" (e.g., dependent on other frames which both precede and follow the frame), and so on.

Figure 3:
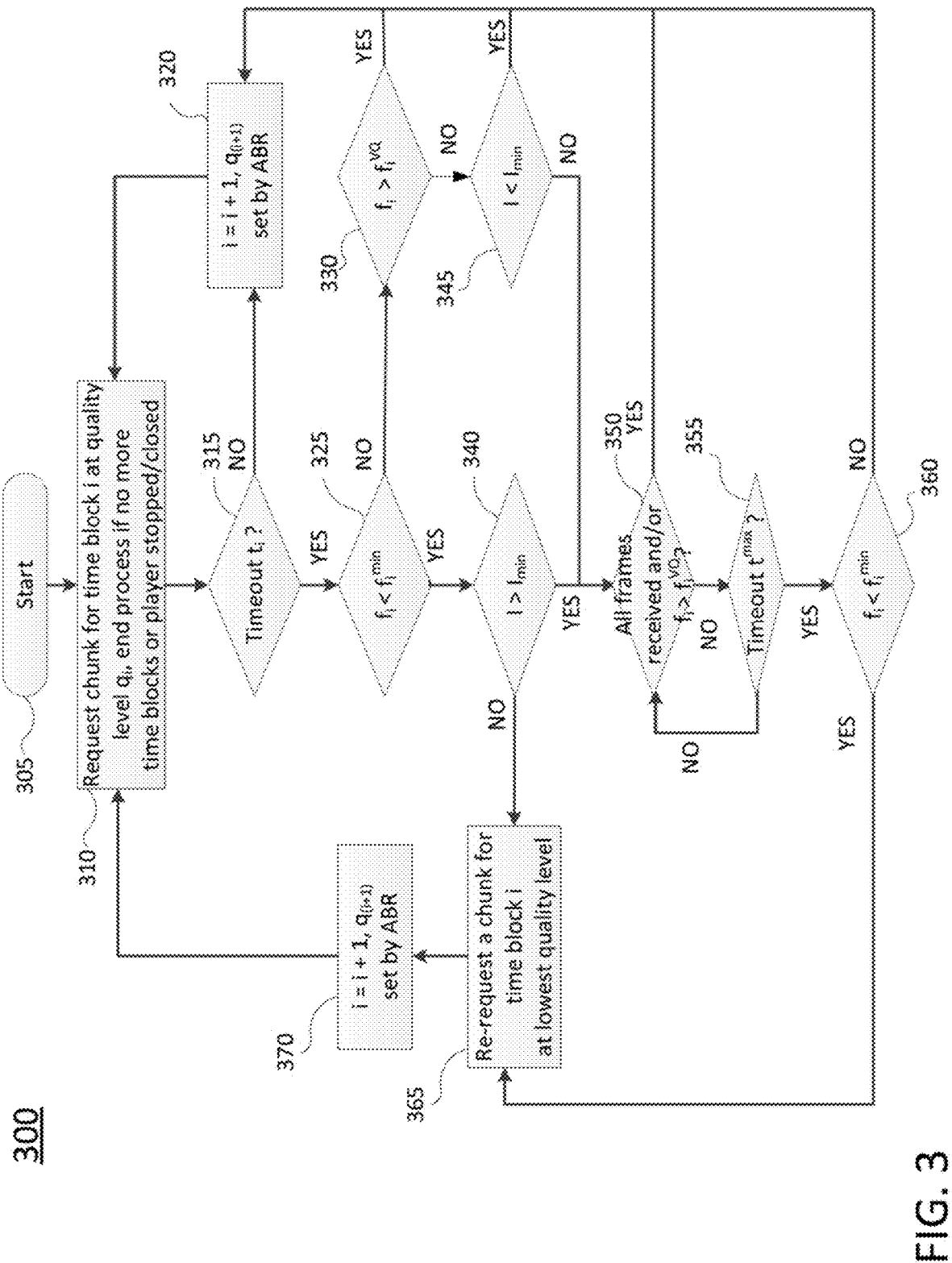
FIG. 3 illustrates a flowchart of an example of processing a partial chunk, in accordance with the present disclosure.

FIG. 3 illustrates an example process 300 for processing partial chunks in accordance with the present disclosure. The process 300 may be performed by an ABR video player/client device, such as, STB/DVR 162A, STB/DVR 162B, one of the TVs 163A or 163B, PC 166, one of the mobile devices 157A, 157B, 167A, or 167B of FIG. 1, and so forth. The process 300 may begin at stage 305 and proceed to stage 310 where the client device may request a first chunk for a first time block i at a quality level $q_i$. It should also be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," do not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the term "first" is used simply as a label and does not imply that a segment or chunk necessarily relates to a beginning segment of a video (although in one example it could be).

In any case, at stage 310 the player may request a video chunk for each time block i at the quality level $q_i$ in accordance with an estimated bandwidth and/or a buffer occupancy level. At stage 315, the player determines if the video chunk for time block i is received before the per-chunk timeout $t_i$. It should be noted that there is variation in the size and/or bandwidth of video chunks from time block to time block, even within a same target bitrate of the ABR scheme. Thus, each chunk may have its own per-chunk timeout $t_i$, which in one example may be obtained by the player from a manifest file for the video. In one example, the per-chunk timeout $t_i$ is calculated based on the actual chunk size ($s_i$) and the estimated bandwidth ($b_i$) at the time that the chunk is to be transmitted, e.g., $t_i = s_i/b_i$. If the video chunk for time block i is received before the per-chunk timeout $t_i$, the player moves on to stage 320 to determine the quality level $q_{(i+1)}$ for a video chunk for a next time block i+1. From stage 320, the player returns to stage 310 to request the video chunk for the next time block i+1 at the quality level that is determined at stage 320. However, if there are no more time blocks, or if the video player is stopped, paused, closed, etc., the process 300 may end.

On the other hand, if at stage 315 it is determined that the video chunk for time block i is not received before the per-chunk timeout $t_i$, it means the actual bandwidth is lower than the estimated bandwidth, causing partial delivery of the chunk by the time of the per-chunk timeout $t_i$. There are three possible cases, depending on the number of frames successfully received (denoted by $f_i$) and the relation to the number of reference frames (e.g., I-frames, P-frames, and B-frames) in the chunk (denoted by $f_i^{min}$) and the per-chunk loss tolerance level ($f_i^{VQ}$).

At stage 325, the player may determine whether $f_i < f_i^{min}$: that is, whether the number of frames successfully received is less than the number of reference frames within the chunk ($f_i^{min}$, which may be the same as or similar to the threshold 210 of FIG. 2). If true, the video chunk is not completely decodable. It should be noted that it may still be possible to play-out the video chunk by recreating missing frames with only the portion of the reference frames that are received. However, for illustrative purposes, it is assumed that given the balance of the number of reference frames versus non-reference frames within each chunk, using only a portion of the reference frames would result in such a poor visual quality such that the partial chunk should not be used.

If $f_i < f_i^{min}$, the player may proceed to stage 340 and determine whether the buffer occupancy level I is healthy, i.e., whether $I > I_{min}$, where $I_{min}$ is a buffer occupancy threshold/minimum buffer occupancy level. If $I > I_{min}$, the player may proceed to stages 350 and 355 and continue to wait to receive more frames of the video chunk for segment i. Otherwise, if the buffer occupancy level is already depleted, e.g., at or below $I_{min}$, the current chunk for time block i is aborted (if the chunk is not of the lowest quality level available). As illustrated in FIG. 3, the player may proceed to stage 365 to re-request a different chunk for the same time block i, but at the lowest available quality level. Following stage 365, at stage 370, the player may determine a quality level $q_{(i+1)}$ for a video chunk for a next time block i+1 according to the ABR scheme, e.g., in accordance with the currently estimated network bandwidth and/or the buffer occupancy level I.

Referring again to stages 350 and 355, the player may wait to receive additional frames of the video chunk for time block i. It is possible that more than the minimum number of frames (e.g., $f_i^{min}$, which may denote a decodability threshold comprising all of the reference frames) has been received such that the video chunk is decodable. However, in the case that all reference frames are received but some b-frames are still missing, the video chunk may be partially decodable, but with noticeable loss in visual quality. Also, the impact level may vary among video chunks. In one example, the present disclosure provides a loss tolerance level, defined as $f_i^{VQ}$, to balance visual quality with visual stability (e.g., maximize peak signal to noise ratio (PSNR) and structural similarity (SSIM) values while minimizing stalls and switches).

In one example, a uniform loss tolerance level may be applied (e.g., between 10 and 30 percent of b-frames, such as 20 percent). However, since the tolerance level varies from chunk to chunk, in one example, a per-chunk loss tolerance level is defined, where $f_i^{VQ}$ may be set according to a motion activity (MA) measure between the GOPs of the video chunk. To illustrate, for high MA (e.g., greater than 0.5), the loss tolerance level may be 20 percent, for example, whereas for low MA, e.g., less than 0.08, the loss tolerance level may be as high as 80 percent, for example. In one example, for MA values between these two extremes, the per-chunk loss tolerance level may be a percentage between 20 and 80. In one example, the possible per-chunk loss tolerance levels may be linearly scaled between these extremes. In another example, the possible per-chunk loss tolerance levels may be stepwise linearly scaled, and so forth.

If all of the frames are received, or if $f_i > f_i^{VQ}$, before a maximum wait time (timeout $t^{max}$), the player may accept the chunk and proceed to step 320. Otherwise, if the timeout $t^{max}$ is reached before all frames of the chunk are received, the player may proceed to stage 360. At stage 360, the player may determine whether the number of frames received $f_i$ is still less than $f_i^{min}$, e.g., the number of reference frames of the chunk. If $f_i < f_i^{min}$, the player may proceed to stage 365 to re-request a different chunk for time block i at the lowest available quality level. Otherwise, if $f_i > f_i^{min}$, the player may accept the (partial) video chunk and proceed to stage 320 to request a video chunk for a next time block i+1 at a quality level $q_{(i+1)}$ according to the ABR scheme.

Referring again to stages 325 and 330, it is possible that more than the minimum number of frames (e.g., $f_i^{min}$, which may denote all of the reference frames) has been received such that the video chunk is partially decodable. However, in the case that all reference frames are received but some b-frames are still missing, the segment may be decodable, but with varying degrees of noticeable loss in visual quality. Accordingly, at stage 330, the player may determine whether the number of frames received $f_i$ exceeds the number of frames denoting a minimum expected visual quality $f_i^{VQ}$: that is, whether $f_i > f_i^{VQ}$. If true, the partial chunk may be accepted by the player. The player may then proceed to stage 320 to request a video chunk for a next time block i+1 at a quality level $q_{(i+1)}$ determined according to the ABR scheme.

In the example of FIG. 3, if the player determines at stage 330 that $f_i < f_i^{VQ}$, the player may proceed to stage 345. At stage 345, the player may determine if the buffer occupancy level I is not below $I_{min}$. If $I > I_{min}$, the player may proceed to stage 350 to determine whether all frames are received and/or the number of frames received $f_i$ exceeds the number of frames to provide the expected visual quality $f_i^{VQ}$. If $f_i > f_i^{VQ}$, the player may proceed to stage 320 as described above. Otherwise, the player may continue to receive frames until all frames are received, $f_i > f_i^{VQ}$, or the timeout $t^{max}$ is reached in stages 350 and 355.

As compared to other bitrate adaptation methods, the process 300 is more aggressive in moving along to a chunk for a next time block. However, the overall visual quality and stability throughout the streaming session is improved. It may be noted that choosing the quality of the next chunk to be downloaded for the next time block is based on the default adaptation algorithm running at the client. Hence, the present process 300 may work along with the existing adaptation algorithm(s) in an HAS-based client. It should also be noted that for certain ABR quality levels, a percentage of b-frames (e.g., up to 40% of b-frames) may be lost while still maintaining a higher visual quality than a next lower quality level. Thus, examples of the present disclosure may allow the use of less ABR quality levels than other schemes. For instance, one or more intermediate quality levels may be eliminated, where an equivalent or similar visual quality may be provided by obtaining partial chunks of a higher bitrate/encoding level (quality level). Although the network bandwidth may not support the obtaining of full chunks at the higher quality level, partial chunks of a sufficient percentage of b-frames may be obtained in a steady state which may provide an average visual quality that is similar to that of an eliminated quality level. In addition, the use of partial chunks in accordance with the present disclosure allows for a more continuous range of visual qualities to be obtained, with less switching between discrete bitrates/encoding levels and a better overall quality of experience to end users.

Figure 4:
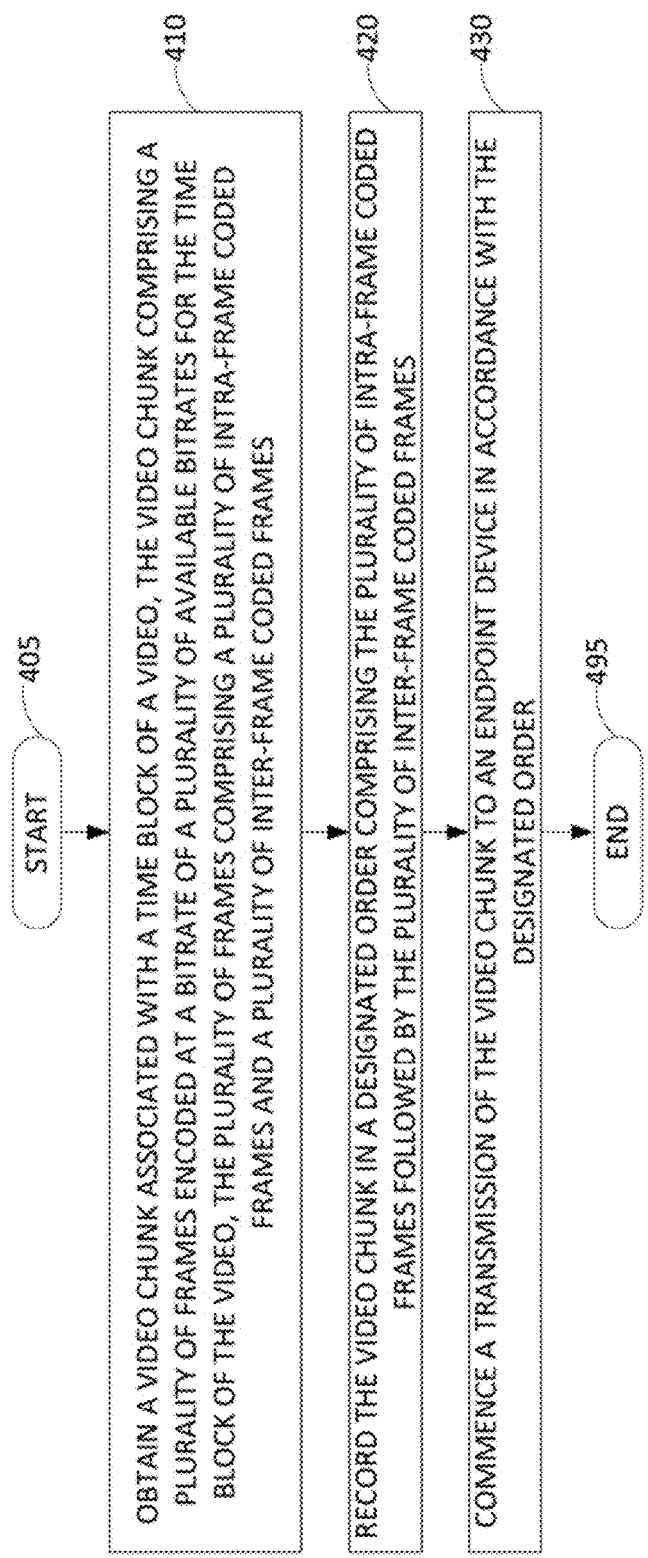
FIG. 4 illustrates a flowchart of an example method for recording a video chunk in a designated order comprising a plurality of intra-frame coded frames followed by a plurality of inter-frame coded frames.

FIG. 4 illustrates a flowchart of a method 400 for recording a video chunk in a designated order comprising a plurality of intra-frame coded frames followed by a plurality of inter-frame coded frames, in accordance with the present disclosure. In one example, the method 400 is performed by one or more network-based devices such as illustrated in FIG. 1, e.g., application servers 114, TV servers 112, ingest server 172, edge server 174, one or more of servers 149, and so forth, or any one more components thereof, such as a processing system, or by one of these devices in conjunction with other devices and/or components of network 100 of FIG. 1. In one example, the steps, functions, or operations of method 400 may be performed by a computing device or system 600, and/or a processing system 602 as described in connection with FIG. 6 below. For instance, the computing device 600 may represent any one or more components of a network-based device or devices that is/are configured to perform the steps, functions and/or operations of the method 400. For illustrative purposes, the method 400 is described in greater detail below in connection with an example performed by a processing system, such as processing system 602. The method 400 begins in step 405 and proceeds to step 410.

At step 410, the processing system obtains a video chunk associated with a time block of a video, where the video chunk comprises a plurality of frames encoded at a bitrate of a plurality of available bitrates for the time block of the video, and where the plurality of frames comprises a plurality of intra-frame coded frames and a plurality of inter-frame coded frames. For instance, the video chunk may be encoded by an HEVC encoder or the like, and may comprise one of a plurality of chunks of different variants for a time block of the video in accordance with an adaptive bitrate streaming protocol. In other words, the video chunk is one of a plurality of video chunks associated with the time block in accordance with an adaptive bitrate streaming protocol, and each of the plurality of video chunks associated with the time block is encoded at a respective one of the plurality of available bitrates. The encoder may generate a sequence of frames, some of which are intra-frame coded frames (e.g., I-frames) and others of which are inter-frame coded frames (e.g., P-frames and B-frames, which may further include reference B-frames and non-reference b-frames). In one example, the processing system may comprise the encoder and may be further configured to perform the steps, functions, operations, and/or blocks of the method 400. In another example, the encoder and processing system performing the method 400 may be separate devices. Thus, for instance, the processing system may obtain at step 410 a video chunk that has been previously encoded and stored. In another example, the processing system may obtain a video chunk for a live video feed.

At step 420, the processing system records the video chunk in a designated order comprising the plurality of intra-frame coded frames followed by the plurality of inter-frame coded frames. For instance, the video chunk may be encoded in one or more Group of Pictures (GOPs) and the processing system may re-arrange the order of frames for recording in the designated order. In one example, the processing system may record the frames in an order of I-frames, followed by P-frames, followed by B-frames, followed by b-frames. In one example, the ordering among b-frames is also randomized to minimize the likelihood that temporally adjacent frames are dropped from playback at a client device.

In one example, step 420 may include storing the video chunk in a storage device in the designated order. In one example, step 420 may alternatively or additionally include queuing the video chunk in a memory in the designated order for the transmission of the video chunk to the client device. For instance, the entire video chunk may be encoded and arranged in the designated order before transmission. Thus, the video chunk may be temporarily stored before the transmission. In one example, the video chunk may be multicast or broadcast to multiple client devices. In another example, the video chunk may be sent to a single device (unicast). In addition, in one example, the video chunk may be transmitted to one or more client devices for a live video feed, while at the same time being stored in a storage device, e.g., for later retrieval for broadcast, VoD streaming, and so on. In one example, step 420 may further include creating a manifest file, or updating a manifest file for the video to include additional information about the video chunk. For instance, the additional information may include motion activity (MA) information, a per-chunk timeout threshold ($t_i$), a minimum decodability threshold (e.g., $f_i^{min}$), a visual quality threshold (e.g., $f_i^{VQ}$), and so on.

At step 430, the processing system may commence a transmission of the video chunk to an endpoint device in accordance with the designated order. For instance, one or more client devices may request the video chunk from the processing system, e.g., in accordance with a manifest file which may identify the properties of the video chunk, the location and/or URL of the video chunk (which may resolve to the processing system), and so on. In one example the commencing may further include completing the transmission. In another example, the processing system may stop the transmission if it is notified by the endpoint device of a drop in network bandwidth or a threshold buffer depletion, if the endpoint device signals in any way that the current video chunk is being dropped, if the processing system is notified that a client video player has been or is being closed, and so on.

Following step 420 or step 430, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processor may repeat one or more steps of the method 400 by obtaining additional video chunks, arranging frames of the video chunks in the designated order, storing and/or transmitting the video chunks in accordance with the designated order, and so on. In another example, the method 400 may further include calculating a visual quality threshold/per-chunk loss tolerance level in accordance with motion activity (MA) measures between group of pictures (GOPs) with the video clip. In another example, step 430 may be omitted or may comprise an optional step. Thus, these and other modifications are all contemplated within the scope of the present disclosure.

FIG. 5 illustrates a flowchart of a method 500 for processing frames of a video chunk received in a designated order comprising a plurality of intra-frame coded frames followed by a plurality of inter-frame coded frames, in accordance with the present disclosure. In one example, the method 500 is performed by an ABR video player/client device, e.g., STB/DVR 162A, STB/DVR 162B, one of the TVs 163A or 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 500 may be performed by a computing device or system 600, and/or a processing system 602 as described in connection with FIG. 6 below. For instance, the computing device 600 may represent any one or more components of a client device that is/are configured to perform the steps, functions and/or operations of the method 500. For illustrative purposes, the method 500 is described in greater detail below in connection with an example performed by a processing system, such as processing system 602. The method 500 begins in step 505 and proceeds to step 510.

At step 510, the processing system receives a first plurality of frames of a first video chunk from a source device, where the first video chunk is associated with a first time block of a video, the plurality of frames comprises a plurality of intra-frame coded frames and a plurality of inter-frame coded frames, and the first plurality of frames are received from the source device in a designated order comprising the plurality of intra-frame coded frames (e.g., I-frames) followed by the plurality of inter-frame coded frames. In one example, the plurality of inter-frame coded frames comprises a plurality of forward predicted frames (e.g., P-frames) and a plurality of bidirectional predicted frames. In addition, in one example, the plurality of bidirectional predicted frames may comprise a plurality of reference bidirectional predicted frames (e.g., B-frames) and a plurality of non-reference bidirectional predicted frames (e.g., b-frames). The designated order may further comprise, among the plurality of inter-frame coded frames, the plurality of forward predicted frames, followed by the plurality of reference bidirectional predicted frames, followed by the plurality of non-reference bidirectional predicted frames. In one example, the designated order may further include a random order among the plurality of bidirectional predicted frames of the video chunk.

At step 515, the processing system records the first plurality of frames in a video buffer. The video buffer may comprise a portion of a memory of a device of the processing system or may be otherwise associated with the processing system. The frames may be recorded in the video buffer in the order received, or may be reordered in an order for presentation/playback. For instance, each frame may be tagged with a frame number indicating the frames' order or position within a sequence of frames, e.g., within the video chunk or time block, and/or within the overall video.

At step 520, the processing system may determine whether a threshold number of frames of the video chunk are received within a timeout period. The timeout period may comprise for example, a per-chunk timeout (e.g., $t_i$, as discussed above in connection with the example of FIG. 3) or a maximum timeout (e.g., $t^{max}$, as discussed above in connection with the example of FIG. 3). The threshold number of frames may comprise the number of reference frames within the video chunk (e.g., $f_i^{min}$, as discussed above in connection with the example of FIG. 3, and which may be the same as or similar to the threshold 210 of FIG. 2) or may comprise a visual quality threshold, or per-chunk loss tolerance level (e.g., $f_i^{VQ}$, as discussed above in connection with the example of FIG. 3) to provide, at a minimum, a particular video quality level. If the threshold number of frames is received within the timeout period, the processing system may accept the first video chunk as a partial chunk (or a complete chunk, if all frames are received before the timeout period) and may proceed to step 525. Otherwise, the processing system may proceed to step 530.

At step 525, the processing system may play the first video chunk (e.g., in accordance with the threshold number of frames, in response to determining at step 520 that the threshold number of frames is received). In one example, step 525 may include substituting prior frames for any missing frames (e.g., non-reference b-frames). In one example, step 525 may comprise determining a temporal sequence of frames for presentation/playback, and playing the frames in such order. For instance, in one example, the frames may be maintained in the video buffer in the designated order in which the frames are received at step 510, rather than the presentation order. In one example, step 525 may be performed with a delay from step 520. For example, the processing system may first play-out frames from an earlier video chunk before playing-out the first video chunk at step 525. It should be noted that the term "first" does not necessarily denote that the first video chunk is for a beginning time block a video, although in one example it may be so.

At step 530, the processing system may request a second video chunk for the time block, e.g., in response to determining at step 520 that the threshold number of frames is not received within the timeout. For example, the second video chunk may be encoded at a lower bitrate than the first video chunk (e.g., a lowest bitrate available, a next lower bitrate as compared to the bitrate of the first video chunk, a bitrate two available encoding levels lower than the bitrate of the first video chunk, etc.). In one example, the processing system may request the second video chunk in accordance with a URL or other identifiers of the second video chunk from a manifest file or the like for the video. In one example, the second video chunk may be requested from a same source as the first video chunk. In another example, the second video chunk may be stored on another device or system from which the processing system may request the second video chunk.

At step 535, the processing system may obtain a second plurality of frames of the second video chunk. For instance, the second plurality of frames may be received from the same or a different source over a network in accordance with the request from the processing system at step 530. In one example, step 535 may comprise similar operations to those which are described above in connection with step 510. For example, the second plurality of frames of the second video chunk may be similarly received in a same designated order as the first plurality of frames of the first video chunk.

At step 540, the processing system may play the second plurality of frames. In one example, step 540 may be performed with a delay from step 535. For example, the processing system may first play-out frames from an earlier video chunk before playing-out the frames of second video chunk at step 540. In one example, step 540 may comprise similar operations to those which are described above in connection with step 525. Following step 540, the method 500 may proceed to step 595 where the method ends.

However, referring again to step 520, the processing system may proceed to step 525 in response to determining that the threshold number of frames is received. In addition, the processing system may proceed to step 550 after playing the first plurality of frames of the first video chunk in accordance with the threshold number of frames at step 525.

At step 550, the processing system may determine a first video quality associated with the threshold number of frames. In one example, step 550 may be performed in accordance with a mapping of a number of frames received and/or lost, and/or a percentage of frames received and/or lost, to a video quality (e.g., a "visual quality"), as described above.

At step 555, the processing system may determine whether the first video quality is higher or lower than a second video quality associated with a lower bitrate (e.g., a next lower bitrate) of an adaptive bitrate streaming protocol as compared to a bitrate of the first video chunk. In one example, step 555 may be performed in accordance with a mapping of bitrates to video quality metrics.

At step 560, the processing system requests a next video chunk associated with a next time block of the video following the first time block, where the next video chunk is requested having the same bitrate as the first video chunk when the first video quality is determined to be higher than the second video quality, and wherein the next video chunk is requested having the lower bitrate (e.g., the next lower bitrate) when the first video quality is determined to be lower than the second video quality. For example, the present disclosure may allow the use of partial chunks which may provide a visual quality/video quality that exceeds that of the next lower bitrate. However, if too much of the end of the video chunk is being dropped based upon the timeout(s), the visual quality may drop below that which can be obtained. In such case, the processing system may decide to change to the (next) lower bitrate for the next video chunk for the next time block.

Following step 560, the method 500 may proceed to step 595 where the method ends.

It should be noted that the method 500 may be expanded to include additional steps, or may be modified to replace steps with different steps, to combine steps, to omit steps, to perform steps in a different order, and so forth. For instance, in one example the processor may repeat one or more steps of the method 500 by returning to step 510 after step 540 and/or after step 560. In one example, step 520 may alternatively or additionally include detecting a drop in a network bandwidth between the processing system and the source device. For instance, the network bandwidth may be estimated based upon the size of the video chunk (e.g., which may be determined from a manifest file for the video, or the like) and the quantity of the video chunk downloaded in a given period of time. In one example, the network bandwidth may be estimated from the download times for a plurality of video chunks or portions of video chunks, e.g., prior to and/or including the current video chunk. In addition, in one example, step 520 may include detecting that the network bandwidth is below a threshold bandwidth level. For instance, the processing system may detect that the network bandwidth has fallen below a level that would support the completion of the download of the current video chunk (or at least a portion thereof comprising $f_i^{min}$ or $f_i^{VQ}$) within a timeout period. In other words, step 520 may instead anticipate that $f_i^{min}$ or $f_i^{VQ}$ will not be received before the actual timeout occurs. In another example, step 520 may include similar operations as described in connection with the process 300 of FIG. 3, e.g., to determine that $f_i^{min}$ number of frames of the first video chunk is received when a per-chunk timeout is reached, and waiting to continue to receive additional frames of the first video chunk until $f_i^{VQ}$ is reached for as long as the buffer does not fall below a minimum buffer occupancy threshold. In still another example, any one or more of steps 520-560 may be omitted or may comprise an optional step. Thus, these and other modifications are all contemplated within the scope of the present disclosure.

In addition, although not expressly specified above, one or more steps of the method 400 or method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 4 and 5 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 or method 500 may comprise optional steps, or can be combined, separated, and/or performed in a different order from that described above, without departing from the example embodiments of the present disclosure. The methods 400 and 500 may also be expanded to include additional steps. Thus, these and other modifications are all contemplated within the scope of the present disclosure.

Figure 6:
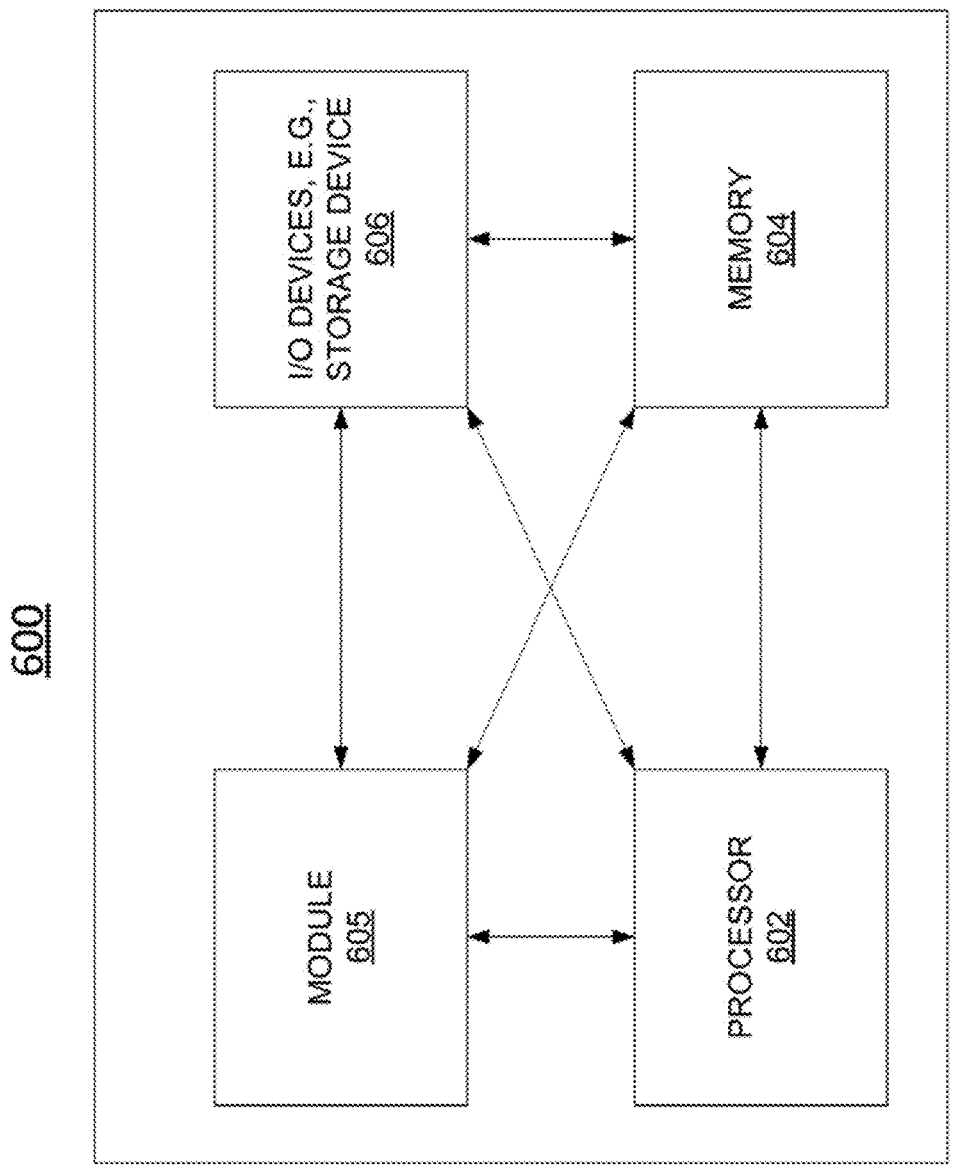
FIG. 6 illustrates a high level block diagram of a computing device specifically programmed to perform the steps, functions, blocks and/or operations described herein.

FIG. 6 depicts a high-level block diagram of a computing device or processing system specifically programmed to perform the functions described herein. For example, any one or more components or devices illustrated in FIG. 1 or described in connection with the process 300, method 400, or method 500 may be implemented as the system 600. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for recording a video chunk in a designated order comprising a plurality of intra-frame coded frames followed by a plurality of inter-frame coded frames and/or for processing frames of a video chunk received in a designated order comprising a plurality of intra-frame coded frames followed by a plurality of inter-frame coded frames, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 606 may also include antenna elements, transceivers, power units, and so forth. Although only one processor element is shown, it should be noted that the computing device may employ a plurality of processor elements. Furthermore, although only one computing device is shown in the figure, if the process 300, method 400, or method 500 as discussed above is implemented in a distributed or parallel manner for a particular illustrative example, i.e., the steps of the above process 300, method 400, or method 500, or the entire process 300, method 400, or method 500 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed process 300, method 400, and/or method 500. In one example, instructions and data for the present module or process 605 for recording a video chunk in a designated order comprising a plurality of intra-frame coded frames followed by a plurality of inter-frame coded frames and/or for processing frames of a video chunk received in a designated order comprising a plurality of intra-frame coded frames followed by a plurality of inter-frame coded frames (e.g., a software program comprising computer-executable instructions) can be loaded into memory 604 and executed by hardware processor element 602 to implement the steps, functions, or operations as discussed above in connection with the illustrative process 300, method 400, and/or method 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for recording a video chunk in a designated order comprising a plurality of intra-frame coded frames followed by a plurality of inter-frame coded frames and/or for processing frames of a video chunk received in a designated order comprising a plurality of intra-frame coded frames followed by a plurality of inter-frame coded frames (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   obtaining, by a processor, a video chunk associated with a time block of a video, wherein the video chunk comprises a plurality of frames encoded at a bitrate of a plurality of available bitrates for the time block of the video, wherein the plurality of frames comprises a plurality of intra-frame coded frames and a plurality of inter-frame coded frames, wherein the plurality of frames is in a first order; and
   recording, by the processor, the video chunk in a second order comprising the plurality of intra-frame coded frames followed by the plurality of inter-frame coded frames, wherein the first order is different from the second order.

2. The method of claim 1, further comprising:
   commencing a transmission of the video chunk to an endpoint device in accordance with the second order.

3. The method of claim 2, wherein the recording comprises:
   queuing the video chunk in a memory for the transmission of the video chunk to the endpoint device.

4. The method of claim 1, wherein the recording comprises:
   storing the video chunk in a storage device.

5. The method of claim 1, wherein the plurality of inter-frame coded frames comprises a plurality of forward predicted frames.

6. The method of claim 5, wherein the plurality of inter-frame coded frames further comprises a plurality of bidirectional predicted frames.

7. The method of claim 6, wherein the plurality of bidirectional predicted frames comprises:
   a plurality of reference bidirectional predicted frames; and
   a plurality of non-reference bidirectional predicted frames.

8. The method of claim 7, wherein the second order further comprises:
   the plurality of forward predicted frames, followed by the plurality of reference bidirectional predicted frames, followed by the plurality of non-reference bidirectional predicted frames.

9. The method of claim 8, wherein the second order further comprises a random ordering of the plurality of non-reference bidirectional predicted frames of the video chunk.

10. The method of claim 1, wherein the video chunk is one of a plurality of corresponding video chunks associated with the time block in accordance with an adaptive bitrate streaming protocol, wherein each of the plurality of corresponding video chunks associated with the time block is encoded at a respective one of the plurality of available bitrates.

11. A device comprising:
    a processing system including at least one processor; and
    a computer-readable medium storing instructions which, when executed by the processing system, cause the processing system to perform operations, the operations comprising:
       receiving a first plurality of frames of a first video chunk from a source device, wherein the first video chunk is associated with a first time block of a video, wherein the first plurality of frames comprises a plurality of intra-frame coded frames and a plurality of inter-frame coded frames, wherein the first plurality of frames is sent by the source device in a first order comprising the plurality of intra-frame coded frames followed by the plurality of inter-frame coded frames, wherein the first plurality of frames is encoded at a first bitrate of a plurality of available bitrates;
       recording the first plurality of frames in a video buffer; and
       playing the first plurality of frames of the first video chunk in a second order or a second plurality of frames of a second video chunk in the second order, wherein the first order is different from the second order.

12. The device of claim 11, wherein the operations further comprise:
    determining whether a threshold number of frames of the first video chunk is received within a timeout period, wherein the playing comprises playing the first plurality of frames of the first video chunk when it is determined that the threshold number of frames is received.

13. The device of claim 12, wherein the playing further comprises:
   requesting the second video chunk for the first time block, when it is determined that the threshold number of frames is not received, wherein the second video chunk is encoded at a lower bitrate than the first bitrate of the first video chunk; and
   obtaining the second plurality of frames of the second video chunk, wherein the playing comprises playing the second plurality of frames.

14. The device of claim 12, wherein the operations further comprise:
   determining a first video quality associated with the threshold number of frames; and
   determining whether the first video quality is higher or lower than a second video quality associated with a lower bitrate of an adaptive bitrate streaming protocol as compared to the first bitrate of the first video chunk.

15. The device of claim 14, wherein the operations further comprise:
   requesting a next video chunk associated with a next time block of the video following the first time block, wherein the next video chunk is requested having the first bitrate as the first video chunk when the first video quality is higher than the second video quality, and wherein the next video chunk is requested having the lower bitrate when the first video quality is lower than the second video quality.

16. The device of claim 11, wherein the plurality of inter-frame coded frames comprises a plurality of forward predicted frames and a plurality of bidirectional predicted frames.

17. The device of claim 16, wherein the plurality of bidirectional predicted frames comprises:
   a plurality of reference bidirectional predicted frames; and
   a plurality of non-reference bidirectional predicted frames.

18. The device of claim 17, wherein the first order further comprises:
   the plurality of forward predicted frames, followed by the plurality of reference bidirectional predicted frames, followed by the plurality of non-reference bidirectional predicted frames.

19. The device of claim 18, wherein the first order further comprises a random ordering of the plurality of non-reference bidirectional predicted frames of the first video chunk.

20. A non-transitory computer-readable medium storing instructions which, when executed by a processing system including at least one processor, cause the processing system to perform operations, the operations comprising:
   receiving a first plurality of frames of a first video chunk from a source device, wherein the first video chunk is associated with a first time block of a video, wherein the first plurality of frames comprises a plurality of intra-frame coded frames and a plurality of inter-frame coded frames, wherein the first plurality of frames is sent by the source device in a first order comprising the plurality of intra-frame coded frames followed by the plurality of inter-frame coded frames, wherein the first plurality of frames is encoded at a first bitrate of a plurality of available bitrates;
   recording the first plurality of frames in a video buffer; and
   playing the first plurality of frames of the first video chunk in a second order or a second plurality of frames of a second video chunk in the second order, wherein the first order is different from the second order.

* * * * *